United States Patent [19]

Watts

[11] E Re. 30,979

[45] Reissued Jun. 22, 1982

[54] METHOD AND APPARATUS FOR CASTING METALS

[75] Inventor: Leonard Watts, North Miami Beach, Fla.

[73] Assignee: Technicon Instruments Corporation, Tarrytown, N.Y.

[21] Appl. No.: 146,627

[22] Filed: May 5, 1980

Related U.S. Patent Documents

Reissue of:

[64] Patent No.: 4,100,960
Issued: Jul. 18, 1978
Appl. No.: 763,478
Filed: Jan. 28, 1977

[51] Int. Cl.[3] ..... B22D 18/04; B22D 27/04

[52] U.S. Cl. ..... 164/119; 164/122; 164/131; 164/133; 164/138; 164/309; 164/348

[58] Field of Search ..... 164/4, 9, 34, 35, 82, 164/85, 86, 89, 119, 122, 123, 126, 128, 131, 133, 136, 138, 154, 303, 306, 309, 338, 344, 413, 414, 436, 437, 439, 440, 441, 443, 113, 120

[56] References Cited

U.S. PATENT DOCUMENTS

| | | | |
|---|---|---|---|
| 2,891,294 | 6/1959 | Müller et al. | 164/120 |
| 2,978,764 | 4/1961 | Hrabovsky | 164/9 |
| 3,191,292 | 6/1965 | Strom | 164/133 X |
| 3,417,810 | 12/1968 | Tiskus et al. | 164/154 X |
| 3,517,725 | 6/1970 | Watts | 164/82 |
| 3,680,624 | 8/1972 | Watts | 164/85 |
| 3,814,166 | 6/1974 | Watts | 164/82 |
| 3,868,988 | 5/1975 | Hansson et al. | 164/86 X |

FOREIGN PATENT DOCUMENTS 1070042 11/1957 France .

*Primary Examiner*—Gus T. Hampilos
*Attorney, Agent, or Firm*—Finnegan, Henderson, Farabow, Garrett and Dunner

[57] ABSTRACT

Method and apparatus for casting a metal article in a mold at least as long as the article, utilizing a cooled mold of elongated form having top and bottom portions. The method includes the steps of introducing molten metal from a source through the bottom portion of the mold, flowing molten metal into the mold so as to form a solidifying casting shell which *a* during casting occupies at least 40% of the cross-sectional mold area and *a* has a molten core, and flowing molten metal from the source through the core towards the mold top *at a filling rate, dependent on the mold cross sectional area, such that the product produced will have a relatively fine grained structure throughout the cross-section thereof.*

12 Claims, 3 Drawing Figures

FIG. 2
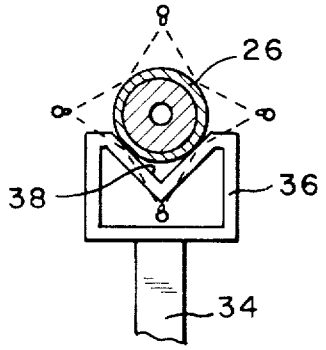
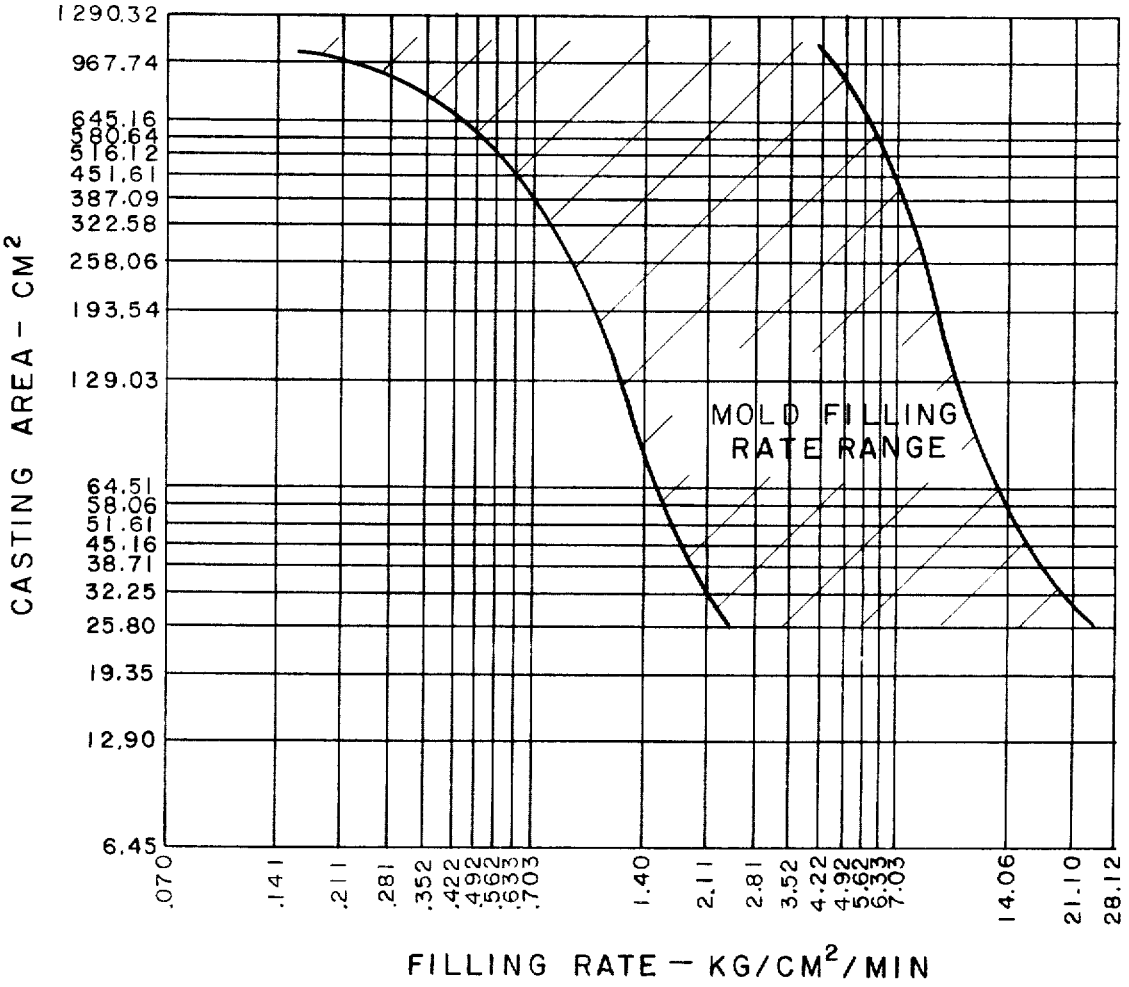
FIG. 3

METHOD AND APPARATUS FOR CASTING METALS

Matter enclosed in heavy brackets [ ] appears in the original patent but forms no part of this reissue specification; matter printed in italics indicates the additions made by reissue.

This invention relates to casting elongated metal articles such as billets in a mold at least as long as the cast article. It provides for control of the rate of solidification of the article during casting for improved physical and morphological characteristics of the cast metal including, but not limited to, significantly improved surface characteristics such as smoothness and subsurface inclusion distribution, for example. It also provides an improved internal microstructure of the casting.

Heretofore, both in casting metal articles of greater or lesser length than their molds, i.e., continuous and non-continuous casting, attempts have been made to control the rate of solidifying metal along a solid/liquid interface during casting, i.e., within the casting at the interface of the solidifying casting shell and the molten metal. These attempts have been characterized by the use of costly and space-consuming apparatus added to the basic casting apparatus to adjust flow of molten metal about the solid/liquid interface subsequent to and independently of the introduction of molten metal into a mold. Such apparatus has taken the form of molten metal stirrers and induction coils, either about the mold or the casting as in Tzavaras U.S. Pat. No. 3,693,697. These coils generate moving magnetic fields in the molten metal which induce flow along such interface for the purpose of removing or inhibiting columnar dendrites, effecting improved dispersion of chemical solutes and inhibiting stratification of inclusions within the major portion of the casting, while inhibiting central porosity.

In my U.S. Pat. No. 3,517,725 issued June 30, 1970, there is disclosed a technique of continuous casting of metal wherein billets of steel and other metals are cast from a closed-end, cooled mold which is relatively separated from a source of molten metal. The closed-end mold forms a shell of the billet being cast through which molten metal flows to the relatively retreating mold, the mold forming the outer shell of the billet at its end remote from the source of molten metal.

In casting metals in a cooled or uncooled mold at least as long as the casting, as opposed to the continuous casting technique of the aforesaid U.S. Pat. No. 3,517,725, it has been a practice to pour molten metal into the mold through the bottom thereof to a height within the mold. During such pouring, a casting shell solidifies against the mold, and the molten metal flows through the shell from the bottom to the top. However, the shell forms significantly less than 40% of the mold cross-sectional area during such casting during mold filling. While the volumetric flow into such mold may be relatively large, there is little or no washing effect of the relatively large liquid core on the solid/liquid interface. Hence, unless otherwise controlled, the rate of solidification cannot be effectively governed, and solidification will take place with the undesirable growth of columnar dendrites resulting in localized solute concentrations, segregated inclusions and centerline porosity, all undesirable in a casting microstructure.

The present invention overcomes many of these difficulties with the prior art.

It is an object of the present invention to achieve the effect of such solidification control apparatus at least largely as a function of molten metal introduction into a mold, to dispense with such costly and cumbersome apparatus of addition, and to generally improve the technique of casting elongated metal articles, particularly those having a melting point in the range of approximately 1,088° to 1,643° C. This invention provides a method and apparatus for casting a metal article in a mold at least as long as the article, utilizing a cooled mold of elongated form having top and bottom portions. The method includes the steps of introducing molten metal from a source through the bottom portion of the mold, flowing molten metal into the mold so as to form a solidifying casting shell which *typically* during casting occupies at least 40% of the cross-sectional mold area and has a molten core, and flowing molten metal from the source through the core towards the mold top.

In the drawings

FIG. 2 is a sectional view taken on line 2—2 of FIG. 1; and

FIG. 3 is a graph showing molten metal introduction rates with reference to molds of different dimensional cross sections.

Figure 1:
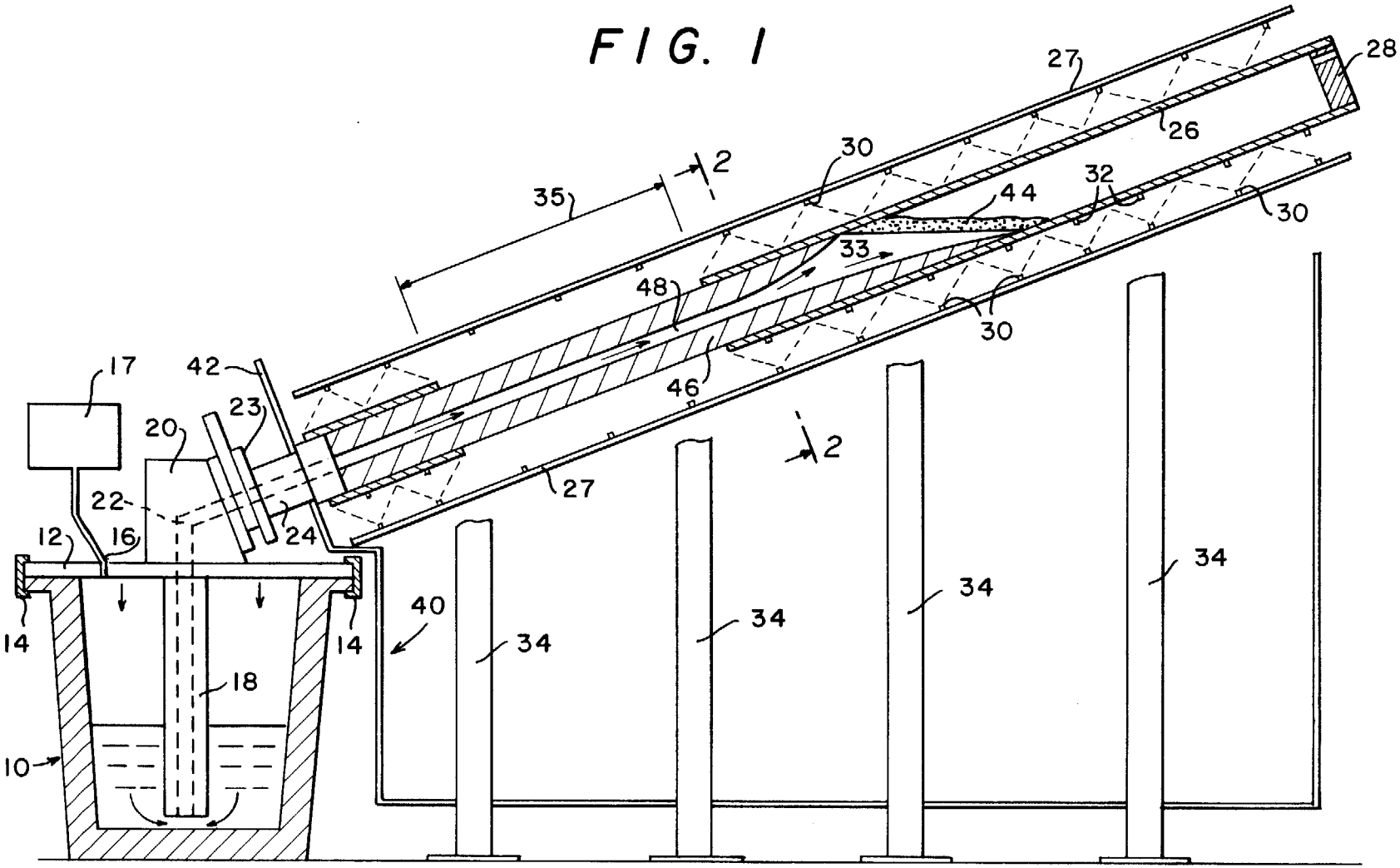
FIG. 1 is a broken, somewhat diagrammatic, side elevational view partially in median section, illustrating apparatus embodying the invention, the apparatus being shown during a casting operation.

In FIG. 1 of the drawing, a source of molten metal is indicated generally at 10, which source may conveniently take the form of a ladle which, by way of example, may contain molten steel to be cast. The source is provided with a cover 12 secured in gas-tight relation to the ladle, as by clamps 14, and has a gas inlet 16 therethrough connected to a pressurizing gas source 17, which may be nitrogen, for example. The cover 12 suspends in source 10 a refractory pipe 18 having an inet end approaching the bottom of the source 10. The interior of the pipe 18 communicates with a passageway 22 extending through a refractory block 20 supported by the cover 12. A gate valve 23, shown in the open position thereof, places the passageway 22 in communication with a refractory nozzle 24. The nozzle extends into the lower end of a mold of elongated form which, by way of example, may be of circular cross-section. The mold is indicated at 26 and is shown inclined to the vertical. In practice, the inclination may be approximately 86°, for example. In principle, the mold may be vertical. However, the hydrostatic pressure of molten metal in such a vertically oriented mold would give rise to such problems as to tend to make such orientation impractical, such as the necessarily relatively large thickness of the mold wall structure and the relatively high pressure required to force molten metal upwardly in such an oriented mold. Such a vertically arranged mold would impart a relatively small meniscus to the molten metal therein, and such a small meniscus is desirable for reasons which will appear hereinafter. The apparatus would be inoperable if the mold were horizontal so that the meniscus of the molten metal therein extended from mold end to mold end as will appear. The upper end of mold 26 is capped, as at 28, by a cap which has a vent hole therethrough for passing gasses from the casting operation and which vent also indicates when the mold is filled by the appearance of metal therethrough. In FIG. 1, the mold 26 is shown as having an intermedicate portion thereof melted away, but it is to be understood that at the commencement of a casting operation, the mold is continuous from bottom to top.

In the form of the invention shown by way of example, the mold 26 is of a sacrificial nature in that it melts away subsequent to the filling of the mold or a portion thereof with molten metal which molten metal solidifies against the cooled wall of the mold prior to the melting off of the mold as will appear more fully hereinafter. Circumferentially arranged around the mold 26 in spaced relation are a plurality of longitudinally extending pipe 27 for conducting a coolant from a source not shown, such coolant, such as water, is jetted against the exterior of the mold during a casting operation as will appear hereinafter, the valves or jets being indicated at 30. The jets 30 may be controlled by thermocouples 32 placed against the side of the mold at axially spaced intervals. The thermocouples 32, which sense rising temperature in the mold; are coupled to a nonillustrated spray or jet-controlling device which may maintain impingement of the coolant against the lower end of the mold throughout a mold filling operation, and provides advancement of a cooling front along an axial portion of the mold in advance of and behind the molten meniscus 33 within the mold during filling, while terminating the impingement of the coolant against the mold a distance, indicated at 35, behind the advancing meniscus, so that in the last-mentioned area the mold may melt off the casting shell. The mold 26 is constructed of a metal characterized by high thermal conductivity in the approximate range of 0.20 cal/cm$^2$/cm/°C./sec. to 0.65 cal/cm$^2$/cm/°C./sec. and having a melting point in the approximate range of 476° to 754° C. The mold may be structured to have a wall thickness in the approximate range of 1.27 mm to 12.70 mm in a mold length of approximately 7.62 to 60.96 meters. Such a mold may be utilized to cast a metal having a melting point in the approximate range of 1,088° to 1,643° C., having a maximum thermal conductivity of approximately 0.25 cal/cm$^2$/cm/°C./sec. The mold which has been described is the presently preferred form only. Other types of bottom-filled molds may be suitable for use with the casting technique described herein.

The mold 26 is supported by columnar supports 34 spaced axially along the mold as shown in FIGS. 1 and 2. The upper part of one such column 34 is shown in FIG. 2 wherein the mold 26 has substantially only line contact with the supporting structure to enable the coolant spray to cover the mold substantially in its entirety to prevent premature melting of the mold. Such support is provided by hollow, open-ended metal block 36 of good thermal conductivity having a V-shaped recess 38 therein which receives the mold 26 as shown, the block 36 being fixed to the upper end of the column 34.

A tank, indicated generally at 40, is supported from the columns 34 to extend under the mold 26 to catch the coolant as it falls after impingement against the mold 26, and also to catch the molten metal from the mold 26 as the mold melts. The tank 40 has a suitable baffle 42 for catching such coolant and metal from the mold. The tank 40 may be provided with a suitable nonillustrated drain, and may be cleaned periodically of the metal collected therein. The metal from the mold is in a molten state when falling and is solidified on contact with water or in passing to the tank.

The apparatus of FIG. 1 is shown during a casting operation, i.e., during the filling of the mold 26 and prior to completion of such filling. Prior to commencement of a casting operation and during assembly of mold 26 with the casting nozzle 24, a quantity of a typical casting powder is inserted in the lower part of the mold, usually in a plastic container which will burn away during exposure to molten metal, to expose the powder therein to such molten metal. The powder 44 liquifies where it interfaces with such metal but, because of its lesser density, rides on the metal meniscus, as shown. The action of such powder will appear hereinafter. On commencement of the casting operation, the pressurizing gas is inletted through the inlet 16 into the metal source 10 causing the molten metal to flow into the inlet end of the pipe 18 and through the block 20 and then open gate valve 23 to the nozzle 24 and into the bottom of the mold 26. The filling rate of the mold is governed by the rising gas pressure in the source 10. As the filling level in the mold advances, molten metal in contact with the cooled mold forms a solidifying shell, indicated at 46, which *in the examples described* occupies at least 40% of the cross-sectional area of the mold and has running therethrough a molten core 48. The introduction of the molten metal into the mold is such that the liquid core 48 sweeps the solid/liquid interface formed in part by the shell 46 in such manner as to inhibit columnar dendritic growth during filling of the mold. It is believed that such sweeping action of the molten core results in at least partially equiaxed dendritic growth but other microstructures are possible. Such sweeping action of the liquid core inhibits the formation of a so-called mushy zone between the truly liquid core and the solidifying shell 46 to thereby enhance the desired thermal gradient for proper solidification of the casting. Such a thermal gradient exists both in longitudinal and transverse directions with reference to the axis of the casting. The axial gradient is highest at the nozzle end of the casting. Solute elements tend to be dispersed uniformly throughout the casting and a portion of inclusions tend to be captured by the casting powder 44 as the liquid metal washes across such casting powder 44 on the filling of the mold. Such chemical and physical action during the casting operation is detailed in Tzavaras U.S. Pat. No. 3,693,697. The aforementioned inclusions, formed prior to solidification, are mainly oxides which are stable at high temperatures. Inclusions formed during solidification are mostly sulfides, tellurides, arsenides, nitrides and some oxides. The usual inclusions in steel are compounds of various solutes or deoxidizers used in steel combined with oxygen, sulphur, and less frequently with nitrogen. The aforementioned solutes, e.g., in steel, are elements other than iron, such as alloying elements. Such pressure pouring of the casting is completed on filling the mold 26 to the top. On completion of the mold filling, the gate valve 23 is closed and the remaining cooling jets are turned off. When all the coolant jets are turned off, the remaining portion of the mold rises in temperature and is melted off leaving the casting supported in the manner in which the mold was previously supported from the columns 34. However, the portion of the mold 26 in which the cap 28 is inserted may not melt off. Such a cast metal product exhibits superior surface characteristics, among others. If desired, several such molds may be filled simultaneously from a single molten metal source as will be obvious. While pressure pouring of the molten metal has been described with reference to the casting technique, it will be evident to those skilled in the art that the mold 26, may be filled by vacuum pouring, and indeed the mold may be filled from the bottom by other pouring techniques.

EXAMPLE

The metal to be cast is AISI-304 stainless steel having a composition of 0.08% carbon max., 2.0% Mn max., 1.0% Si max., 18–20% Cr, 8.0–11% Ni, 0.040% P max., 0.030% S max., (balance Fe) and solidus at 1,427° C. and liquidus at 1,510° C., wherein the thermal conductivity is 0.039 cal/cm$^2$/cm/°C./se at 100° C. The mold composition is aluminum 2024 alloy having a composition of 4.5% Cu, 1.5% Mg, 6% Mn (Balance Al) and solidus at 502° C. and liquidus at 638° C., wherein the thermal conductivity is 0.45 cal/cm$^2$/cm/°C./sec. at 25° C. The mold is 30.48 meters long, has a wall thickness of 4.75 mm and has an internal cross-section of 100 mm$\times$100 mm. The mold filling rate by pressure pouring is 4.834 kg/cm$^2$/min (483.4 kg/min). The liquid core diameter is approximately 50.8 mm while the liquid core velocity is 31.39 meters/min approximately.

There is shown in FIG. 3 a graph illustrating different metal introduction rates with reference to molds of different cross-sectional areas. As shown there, a mold having a cross-sectional area of 25.81 cm$^2$ has molten metal introduced thereinto for filling at a rate between approximately 2.39–23.9 kg/cm$^2$/min. There is also shown that for a mold having a cross-sectional area of 967.74 cm$^2$ the molten metal introduction rate is between approximately 0.239–4.78 kg/cm$^2$/min. in this non-linear relationship. This relationship requires the use of a mold whose thermal conductivity is at least 0.20 cal/cm$^2$/cm/°C./sec. Molds having intermediate cross-sectional areas have intermediate molten metal introduction rates as indicated by the graph.

While several forms of the method and apparatus for casting a metal article have been described, it will be apparent, especially to those versed in the art, that the invention may take other forms and is susceptible to various changes in details without departing from the principles of the invention.

What is claimed is:

1. A method of casting a metal article in an elongated mold having a cross-sectional area substantially between 25.8 cm$^2$ and 967.74 cm$^2$, [a thermal conductivity of at least 0.20 cal/cm$^2$/cm°C./sec.,] and a length at least as long as the article to be cast, said mold having top and bottom portions comprising:

inclining said mold to the vertical;

introducing molten metal from a source through said bottom portion of said mold at a filling rate substantially between 0.239 kg/cm$^2$/min. and 23.9 kg/cm$^2$/min., the combination of filling rate and cross-sectional area of the mold being defined by the hatched area of the graph as shown in FIG. 3;

flowing molten metal along said mold by applying a differential pressure across said source and said top portion of said mold;

cooling the mold while regulating the flow of said molten metal therealong to form a solidified casting shell which [, during casting, occupies at least 40% of the cross-sectional mold area and] has a molten core;

flowing molten metal from said source to extend said casting shell and said molten core toward said top portion of said mold; and subsequently solidifying said molten core *to produce a product having a relatively fine-grained structure throughout the cross-section thereof.*

2. A method as defined in claim 1 wherein: said metal of said mold has a thermal conductivity of about 0.20 cal/cm$^2$/cm/°C./sec. to 0.65 cal/cm$^2$/cm/°C./sec.

3. A method as defined in claim 1, further including placing a casting powder in said mold for exposure to said molten metal.

4. A method as defined in claim 1, wherein: the filling rate of a mold cross section of 25.81 cm$^2$ is between approximately 2.39–23.9 kg/cm$^2$/min. and of a mold cross section of 967.74 cm$^2$ is between approximately 0.239–4.78 kg/cm$^2$/min. and for a mold cross section therebetween has an intermediate filling rate.

5. A method as defined in claim 1, wherein: said mold is structured of metal of relatively high thermal conductivity and having a relatively thin wall, and wherein said cooling step comprises directing jets of coolant on at least a part of said wall, and discontinuing directing said jets over a portion of said wall during flow of molten metal through said core to melt off at least said portion of said wall from said article.

6. A method as defined in claim 5, wherein: said metal of said mold has a melting point of about 476° to 754° C., said metal of said cast article having a melting point of about 1,088° C. to 1,643° C.

7. A method as defined in claim 5, further including supporting the mold from at least one support element, and supporting the casting from said support element on the melting off of at least a portion of said mold from said article.

8. A method as defined in claim 5, wherein: said mold wall thickness is about 1.27 to 12.7 mm.

9. Apparatus for casting an elongated article comprising:

a source of molten metal;

a mold inclined towards the vertical and being at least as long as said article to be cast, said mold associated with said source of molten metal having a bottom including an opening and a top portion, said mold further having a cross-sectional area between 25.8 cm$^2$ and 967.74 cm$^2$ [and a thermal conductivity of at least 0.20 cal/cm$^2$/cm/°C./-sec.];

means for introducing molten metal into said mold opening at a filling rate substantially between 0.239 kg/cm$^2$/min. and 23.9 kg/cm$^2$/min., the combination of filling rate and cross-sectional area of the mold being defined by the hatched area of the graph as shown in FIG. 3, said introducing means associated with said source of molten metal including means for applying a differential pressure between said source and said top portion of said mold to regulate the flow of molten metal along said mold;

means cooling said mold to form a solidifying casting shell which [, during casting, occupies at least 40% of the cross-sectional mold area and] has a molten core, said introducing and means associated with said mold for flowing molten metal from said source along said core to extend said casting shell and said molten core toward said top of said mold and after casting is completed for solidifying said molten core *to produce a product having a relatively fine-grained structure throughout the cross-section thereof.*

10. A mold as defined in claim 9, wherein: said mold is constructed of metal of relatively high thermal conductivity and having a relatively thin wall, said cooling means comprising means for directing coolant jets over at least part of said wall, and further including valve means associated with said cooling means for shutting down at least some of said jets during filling of said mold, so as to raise the temperature of and melt off at least a portion of said mold, said metal of said mold having a melting point of about 476° to 754° C. and said metal of said cast article having a melting point of about 1,088° to 1,643° C.

11. Apparatus as defined in claim 10, wherein: said metal of said mold has a thermal conductivity of about 0.20 cal/cm$^2$/cm/°C./sec. to 0.65 cal/cm$^2$/cm/°C./sec.

12. Apparatus as defined in claim 11, wherein: said mold wall thickness is about 1.27 mm to 12.70 mm.

* * * * *

UNITED STATES PATENT AND TRADEMARK OFFICE

CERTIFICATE OF CORRECTION

PATENT NO. : Re. 30,979

DATED : June 22, 1982

INVENTOR(S) : Leonard Watts

It is certified that error appears in the above—identified patent and that said Letters Patent is hereby corrected as shown below:

ABSTRACT, Line 7, change the italicized "a" to an open bracket ([); and

ABSTRACT, Line 9, change the italicized "a" to a close bracket (]).

Signed and Sealed this

*Seventeenth* Day of *April 1984*

[SEAL]

*Attest:*

GERALD J. MOSSINGHOFF

*Attesting Officer*

*Commissioner of Patents and Trademarks*